March 16, 1965 P. C. GELFAND 3,173,772
APPARATUS FOR CONTROLLING AN ELECTRICAL PRECIPITATOR
Filed Feb. 9, 1962 2 Sheets-Sheet 2
PULSE INPUT | OUTPUT, FIRST INTEGRATOR STAGE-32 | OUTPUT, SECOND INTEGRATOR STAGE-40
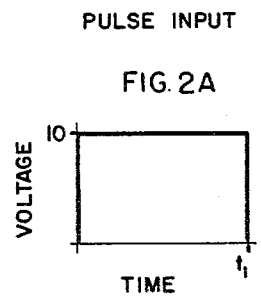
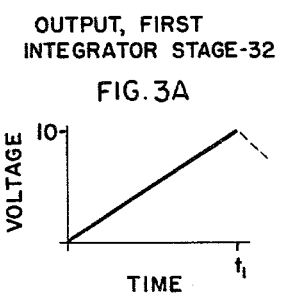
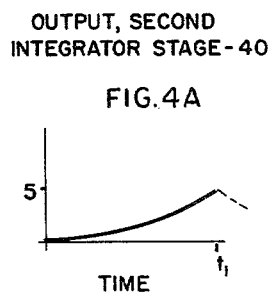
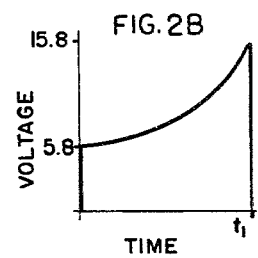
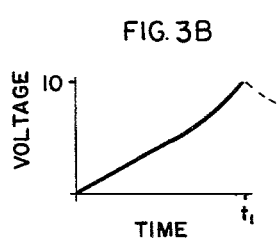
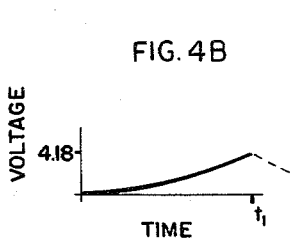
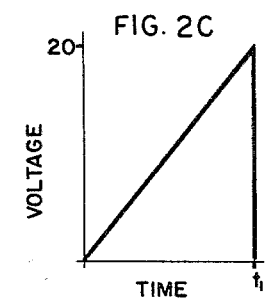
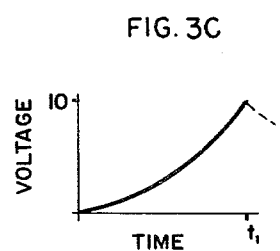
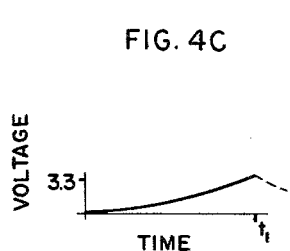
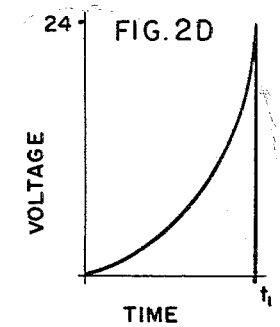
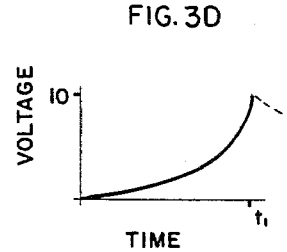
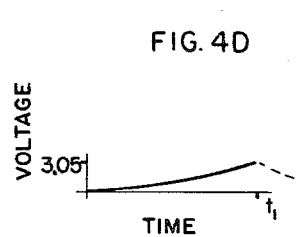
INVENTOR.
PETER C. GELFAND
BY
Brumbaugh, Free, Graves & Donohue
ATTORNEYS

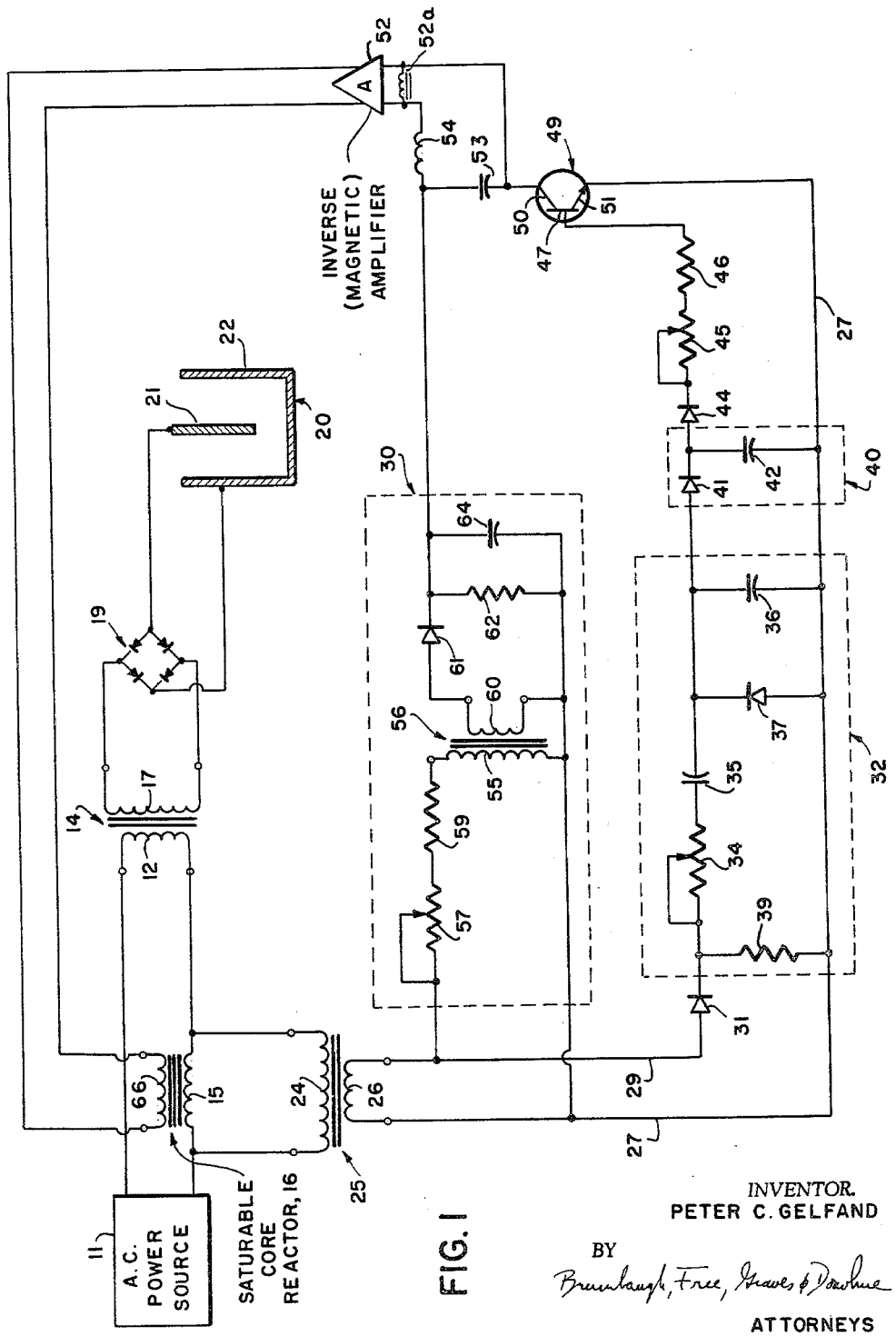

United States Patent Office 3,173,772
Patented Mar. 16, 1965

3,173,772
APPARATUS FOR CONTROLLING AN
ELECTRICAL PRECIPITATOR
Peter C. Gelfand, Brooklyn, N.Y., assignor to Buell Engineering Company, Inc., New York, N.Y., a corporation of New York
Filed Feb. 9, 1962, Ser. No. 172,271
4 Claims. (Cl. 55—105)

This invention relates to electrical precipitators and, more particularly, to a control system for varying the energization of a precipitator so that the precipitator operates with maximum efficiency.

Conventional electrical precipitators, used to remove suspended particles from a gas stream, operate with a relatively high D.C. voltage applied across their collecting electrodes. Increasing the voltage across the electrodes to obtain maximum operating efficiency leads first to sparking and then to arcing. Precipitator efficiency is at its maximum during sparking and is virtually zero during arcing.

To maintain the voltage across the electrodes of a precipitator at a level sufficiently high to result in optimum sparking but not in arcing, the practice heretofore has been to sense the sparking and to integrate a signal representative of the sparking to produce a control signal that is used to vary the voltage between the electrodes of the precipitator. Such a technique involves only a single integration that produces a signal which is, at best, indicative of the number of sparks occurring in a given period or of the energy content of the sparks over the period. As a result, the control signal produced thereby does not necessarily lead to optimum sparking and maximum precipitator efficiency.

In accordance with the present invention, a sparking signal is developed which is integrated not only once, but twice, to provide a signal for controlling the voltage applied to the electrodes of a precipitator. This control signal is representative of the energy of the sparking pulses, their rates of rise, and their magnitudes. It has been found in practice that such a control signal results in a higher precipitator operating voltage and a higher precipitator efficiency.

In an illustrative embodiment of the present invention, the load winding of a saturable core reactor is placed in series with and samples the current supplied to the primary winding of a step-up transformer whose secondary winding is coupled to the electrodes of a precipitator through a rectifier network. The voltage developed across the load winding of the saturable core reactor contains a component which is representative of the sparking in the precipitator. This component is isolated and then integrated twice in two resistor-capacitor networks, the second one of which includes a unidirectionally conducting device or diode having a resistive component associated therewith to provide the resistance necessary for the integration. The double integrated signal, after suitable amplification, is then used to control the impedance of the load winding of the saturable core reactor, thus to control, in turn, the input voltage which is applied to the primary winding of the step-up transformer.

Although the invention has been described generally above, a detailed description thereof follows, which is to be read in conjunction with the appended drawings in which:

FIG. 1 is a block and schematic diagram of an illustrative precipitator control circuit embodying the principles of the present invention;

FIGS. 2A–2D are waveform diagrams of pulses representative of various types of sparking in a precipitator;

FIGS. 3A–3D are waveform diagrams representing the first integrals of the pulses shown in FIGS. 2A–2D; and FIGS. 4A–4D are waveform diagrams representing the second integrals of the pulses shown in FIGS. 2A–2D.

Referring to FIG. 1, an A.C. power source 11 is coupled to primary winding 12 of a step-up transformer 14 through load winding 15 of a saturable core reactor 16. Secondary winding 17 of the step-up transformer 14 produces a relatively high A.C. operating voltage across a rectifier network 19 which, in turn, applies a full wave rectified signal to a precipitator 20. In FIG. 1, the precipitator 20 is represented only diagrammatically as comprising an inner electrode 21 and an outer electrode 22. Gas that contains suspended particles (not shown) is passed between the electrodes 21 and 22, and the particles are precipitated by virtue of the relatively high D.C. voltage applied to the electrodes.

Sparking between the electrodes 21 and 22 of the precipitator 20 produces a series of corresponding pulses in the load winding 15 of the saturable core reactor 16. FIGS. 2A–2D represent four typical pulses that might be produced in the load winding 15 as a result of different types of sparking in the precipitator 20. The pulses shown in FIGS. 2A–2D all have the same energy content and all are of the same time duration, although their waveforms differ. For example, the pulse in FIG. 2A is a 10-volt pulse continuing for a time $t_1$. The pulse in FIG. 2B has the same energy content as the pulse in FIG. 2A and, for a time $t_1$ equal to one second, its magnitude is given by the equation:

$$P_B = 5.8e^t \tag{1}$$

where $P_B$ is the magnitude of the pulse in volts, $e$ is the natural logarithm base, and $t$ is the time in seconds measured from the commencement of the pulse.

Similarly, the pulse shown in FIG. 2C is given by the equation:

$$P_C = 20t \tag{2}$$

and the pulse in FIG. 2D is expressed as:

$$P_D = 14(e^{t-1}) \tag{3}$$

The load winding 15 of the saturable core reactor 16, producing pulses representative of sparking in the precipitator 20 and similar to those shown in FIGS. 2A–2D, is coupled to primary winding 24 of a step-down transformer 25. Secondary winding 26 of the step-down transformer 24 is coupled to a common conductor 27 and to another conductor 29 that applies the signal from the secondary winding 26 to a power supply 30 and to a diode 31.

The diode 31 rectifies the signal from the secondary winding 26 to produce a signal of one polarity only which is applied to what may be termed a first integrating stage 32. Within the stage 32 the signal from the diode 31 is applied to a variable resistor 34 and thence to a capacitor 35. The capacitor 35 serves to block out the component of the applied signal that is of a frequency equal to that of the A.C. power source 11. The signal from the capacitor 35, therefore, is representative only of the sparking between the electrodes 21 and 22 of the precipitator 20.

A capacitor 36 operates in conjunction with the variable resistor 34 to provide an integration of the signal representative of sparking in the precipitator 20. In addition, the capacitor 36 bypasses A.C. signals derived from the source 11 that are not blocked completely by the capacitor 35, although its main function is to serve as an integrating capacitor in the R-C network including the resistor 34. Also included in the first integrating stage 32 are a diode 37 and a resistor 39 which, together with the variable resistor 34, provide a discharge path for the capacitor 35 to prevent the capacitor from becoming fully charged by the component of the signal from the diode 31 derived from the A.-C. power source 11.

FIGS. 3A–3D represent the output signals from the integrator stage 32 produced in response to the corresponding pulse input signals of FIGS. 2A–2D. As may be seen, the pulses shown in FIGS. 2A–2D are of equal energy content so that the output pulses 3A–3D are all equal in magnitude at the time $t_1$. For the scale chosen in FIGS. 2A–2D and at the time $t_1$ equal to one second, the output pulses are all 10 volts.

Thus, any system which uses the first integral of a spark pulse signal to control the electrode voltage of a precipitator will not distinguish between pulses of varying waveforms so long as the pulses have the same energy content. As has been explained previously, however, pulse shape is indicative of the ntaure of sparking in a precipitator, and thus a control signal which represents only the first integral of a spark signal is deficient in providing an optimum control signal.

Pursuant to the invention, the signal from the first integrating stage 32 is applied to a second integrating stage 40 which comprises a unidirectionally conducting device or diode 41 and a capacitor 42. Integration of the input signal is provided by the forward resistance of the diode 41 and the capacitance of the capacitor 42. Additionally, the diode 41 prevents discharge of the capacitor 42.

FIGS. 4A–4D represent the output signals from the second integrator stage 40 produced in response to the corresponding input signals of FIGS. 3A–3D. As may be seen, for the same time $t_1$, the output signals from the second integrator stage 40 vary from 5 volts (FIG. 4A) to 3.05 volts (FIG. 4D). However, it must be remembered that the pulses of FIGS. 4A–4D also represent the second integrals of the pulses of FIGS. 2A–2D, respectively. Thus, if the pulses of FIGS. 2A–2D are considered to be decreasing, inasmuch as severity of sparking is concerned, it may be noted that the signals of FIGS. 4A–4D decrease correspondingly in magnitude. Therefore, although the energy contents of the sparking pulses of FIGS. 2A–2D are the same, the waveforms of those pulses are not the same and are truly represented by the second integrals of the sparking pulses.

The output signal from the second integrating stage 40 which is representative of the second integral of the sparking pulses, is applied through a diode 44, a variable resistor 45, and a fixed resistor 46 to base 47 of a transistor 49. The diode 44 prevents conduction across the transistor 49 from its collector 50 to its base 47, and the variable resistor 45 controls the magnitude of the base current. Emitter 51 of the transistor 49 is coupled to the common conductor 27.

The collector 50 of the transistor 49 is coupled through a coil 52a that forms part of an inverse amplifier 52, which may be a magnetic amplifier, for example, and through a choke coil 54 to the power supply 30 which operates to bias the collector 50 of the transistor 49. A capacitor 53 also couples the collector 50 to the power supply 30, and serves, along with the choke coil 54, to filter any feedback voltages which exist across the coil 52a internal to the magnetic amplifier 52.

The power supply 30 receives an input signal from the secondary winding 26 of the step-down transformer 25. This signal is applied across primary winding 55 of a step-down transformer 56 through a variable resistor 57 and a fixed resistor 59. The magnitude of the voltage impressed across the primary winding 55 is controlled by the variable resistor 57 and the resistor 59. The transformer 56 is chosen to have a frequency response which drops off considerably at the relatively high frequencies at which sparking pulses occur. Thus, secondary winding 60 supplies a voltage at the A.C. power source frequency to a half-wave rectifier diode 61. A parallel combination of a resistor 62 and a capacitor 64 filter the rectified voltage and also serve to suppress that remanent portion of the rectified signal which is representative of sparking in the precipitator. The output from the power supply 30, which is a filtered D.C. signal, is used to bias the collector 50 of the transistor 49 through the choke coil 54 and the coil 52a of the inverse amplifier 52.

The inverse amplifier 52 amplifies inversely the signal from the second integrating stage 40 after that signal is amplified by the transistor 49. That is, a large input signal to the inverse amplifier 52 produces a small output signal, while a small input signal produces a large output signal. The output of the inverse amplifier 52 is coupled to control winding 66 of the saturable core reactor 16. As the control winding 66 is energized, it varies the impedance developed across the load winding 15 of the saturable core reactor, and thus varies the proportion of the voltage from the A.C. power source 11 that is applied to the primary winding 12 of the step-up transformer 14. Specifically, when a large current is flowing through the control winding 66, the impedance of the load winding 15 is relatively small and, therefore, the primary winding 12 receives a relatively high input voltage. On the other hand, if a relatively small current is flowing through the control winding 66, the load winding 15 exhibits a relatively high impedance and, therefore, the primary winding 12 has a relatively low input voltage impressed across it.

The operation of the overall circuit is as follows. A spark between the electrodes 21 and 22 of the precipitator 20 results in a voltage pulse across the load winding 15 of the saturable core reactor 16. This pulse is transmitted through the transformer 25 to the first integrating stage 32, which produces an output signal representative of the first integral of the pulse. This signal is then applied to the second integrating stage 40 which integrates the signal further to provide a control signal representative of the second integral of the spark pulse. The control signal from the second integrating stage 40 is amplified by the transistor 49 and applied to the inverse amplifier 52 which, because its input signal has increased, produces a decreasing output signal. This smaller output signal from the inverse amplifier 52 results in a smaller energizing current in the control winding 66 of the saturable core reactor 16, which, in turn, produces an increased impedance across the load winding 15. The increased impedance of the load winding 15 results in a decrease in the amount of voltage applied from the A.C. power source 11 to the primary winding 12 of the step-up transformer 14, thereby decreasing the magnitude of the D.C. voltage applied to the electrodes 21 and 22 of the precipitator 20. In this fashion, sparking in the precipitator 20 results in a decreased precipitator operating potential.

By the same token, if no sparking occurs in the precipitator 20, the transistor 49 produces a small output signal, thus resulting in a relatively large output signal from the inverse amplifier 52. This provides a relatively large energizing current to the control winding 66, which results in a low impedance in the load winding 15 of the saturable core reactor and, therefore, a relatively large applied input voltage to the primary winding 12 of the step-up transformer 14. In this fashion, little or no sparking results in a higher operating potential across the electrodes 21 and 22 of the precipitator 20.

It is apparent that a novel system has been provided for controlling the operating potential of a precipitator in accordance with sparking therein, which takes into account spark pulse energy and wave form. The response time and overall pulse sensitivity of the sensing device when properly adjusted will permit the precipitator excitation to be adjusted continually to its optimum setting for any particular instantaneous gas loading condition.

I claim:

1. In a circuit for energizing an electrical precipitator, the combination comprising first circuit means conducting current to the precipitator and responsive to changes in said current due to sparking pulses in the precipitator for generating a sparking signal representative of the energy content and the waveform of said sparking pulses, a first integrating circuit coupled to said first circuit means and responsive to the sparking signal to generate an integrated signal substantially representative of the first integral of the sparking signal, a second integrating circuit coupled to the output of the first integrating circuit and responsive to the integrated signal to generate a control signal substantially representative of the second integral of the sparking signal, and second circuit means coupled to the second integrating circuit and to the first circuit means and responsive to the control signal for varying the energization of the precipitator.

2. In a circuit for energizing an electrical precipitator, the combination comprising first circuit means conducting current to the precipitator and responsive to changes in said current due to sparking pulses in the precipitator for generating a sparking signal representative of the energy content and the waveform of said sparking pulses, a first integrating circuit including a capacitor and a resistor coupled to said first circuit means for generating a first signal substantially representative of the first integral of the sparking signal, a second integrating circuit including a unidirectionally conducting device having a resistance associated therewith and a second capacitor, said second integrating circuit being coupled to the output of the first integrating circuit for generating a control signal substantially representative of the second integral of the sparking signal, and second circuit means coupled to the second integrating circuit and to the first circuit means and responsive to the control signal for varying the energization of the precipitator.

3. In a circuit for energizing an electrical precipitator, the combination comprising first circuit means conducting current to the precipitator and responsive to changes in said current due to sparking pulses in the precipitator for generating across first and second electrical conductors a sparking signal representative of the energy content and the waveform of said sparking pulses, a resistor having first and second terminals and coupled at its first terminal to the first conductor, a capacitor coupling the second conductor to the second terminal of the resistor, a unidirectionally conducting device exhibiting a resistance characteristic and having first and second terminals and coupled at its first terminal to the second terminal of the resistor, a second capacitor coupling the second terminal of the unidirectionally conducting device to the second conductor, and second circuit means coupled to the second terminal of the unidirectionally conducting device and to the first circuit means and responsive to the signal appearing on the second terminal of the unidirectionally conducting device for varying the energization of the precipitator.

4. Apparatus for energizing electrodes of an electrical precipitator comprising a primary winding of a transformer adapted to be coupled to an alternating current power supply, a saturable core reactor having load and control windings, the load winding being connected in series with the primary winding of the transformer, a rectifier network connected to a secondary winding of the transformer, the rectifier network adapted to be connected to the precipitator electrodes, filter means coupled across the saturable core reactor load winding for blocking current of the power supply frequency, a first integrating network including a capacitor and a resistor connected to the output of the filter means, a second integrating network including a unidirectionally conducting device and a second capacitor connected to the output of the first integrating network, and control means coupled to the output of the second integrating network and to the saturable core reactor control winding for varying the impedance of the saturable core reactor load winding.

References Cited in the file of this patent

UNITED STATES PATENTS

| 2,623,608 | Hall | Dec. 30, 1952 |
| 2,642,149 | Backer et al. | June 16, 1953 |
| 2,666,496 | Willison | Jan. 19, 1954 |
| 2,675,092 | Hall | Apr. 13, 1954 |
| 2,742,104 | Hall | Apr. 17, 1956 |
| 2,752,000 | Hall | June 26, 1956 |
| 2,771,150 | Welts | Nov. 20, 1956 |
| 2,783,388 | Wintermute | Feb. 26, 1957 |
| 2,841,239 | Hall et al. | July 1, 1958 |
| 2,943,697 | Little | July 5, 1960 |
| 2,992,699 | Jarvinen | July 18, 1961 |
| 3,089,082 | Little | May 7, 1963 |

FOREIGN PATENTS

| 224,519 | Australia | Oct. 2, 1959 |